(12) United States Patent
Faulkner et al.

(10) Patent No.: US 7,477,502 B1
(45) Date of Patent: Jan. 13, 2009

(54) METHOD AND SYSTEM FOR PROVIDING FAULT PROTECTION IN A POWER SUPPLY SYSTEM

(75) Inventors: Michael A. Faulkner, Grafton, MA (US); Phillip J. Roux, Sutton, MA (US); Paul H. Maier, Jr., Athol, MA (US)

(73) Assignee: EMC Corporation, Hopkinton, MA (US)

( * ) Notice: Subject to any disclaimer, the term of this patent is extended or adjusted under 35 U.S.C. 154(b) by 87 days.

(21) Appl. No.: 10/812,429

(22) Filed: Mar. 30, 2004

(51) Int. Cl.
*H02H 3/08* (2006.01)
(52) U.S. Cl. .................................................. 361/93.7
(58) Field of Classification Search ................. 361/93.7
See application file for complete search history.

(56) References Cited

U.S. PATENT DOCUMENTS

| | | | | |
|---|---|---|---|---|
| 3,886,932 | A * | 6/1975 | Suessmilch | 600/508 |
| 4,241,372 | A * | 12/1980 | Sears | 361/72 |
| 5,654,859 | A * | 8/1997 | Shi | 361/66 |
| 6,137,267 | A * | 10/2000 | Kates et al. | 320/136 |

OTHER PUBLICATIONS

"ORing MOSFET Controllers with Fastest Fault Isolation for Redundant Power Supplies, MAX8535/MAX8536; 19-2735, Rev 0; Jan. 2003", Maxim Integrated Products, 120 San Gabriel Drive, Sunnyvale, CA 94086.

* cited by examiner

*Primary Examiner*—Stephen W Jackson
*Assistant Examiner*—Scott Bauer
(74) *Attorney, Agent, or Firm*—Krishnendu Gupta; Scott A. Ouellette (57) ABSTRACT

A power supply system includes a power supply; a load coupled to the power supply via a power supply line to receive a voltage therefrom; and a circuit protection device. The circuit protection device includes at least one switch device coupled between the power supply and the load on the power supply line; a first controller coupled to the at least one switch for: A. monitoring current flow through the at least one switch; B. maintaining the at least one switch in an ON state while current flows through the at least one switch in a first direction; and C. causing the at least one switch to toggle to an OFF state if current flowing through the at least one switch flows in a second direction and a second controller coupled to the power supply line between the power supply and the at least one switch and coupled to the at least one switch for sensing an amount of current flowing between the power supply and the at least one switch and causing the at least one switch to toggle to the OFF state when the current sensed by the second controller exceeds a reference value.

5 Claims, 6 Drawing Sheets

METHOD AND SYSTEM FOR PROVIDING FAULT PROTECTION IN A POWER SUPPLY SYSTEM

FIELD OF THE INVENTION

The present invention is directed generally to power supply systems and more particularly to a method and system for providing fault protection in a power supply system.

BACKGROUND OF THE INVENTION

High-availability data storage systems require multiple power supplies which are used to supply redundant power to certain components of the data storage system via, in particular the disk drive array, via a common power bus. Each power supply may also supply power to other subsystem components in a non-redundant manner. In order to prevent faults in one of the power supplies or subsystem components from adversely affecting the performance of the components in the rest of the data storage system, these systems typically include fault protection devices which prevent faults in the common load from affecting the operation of the power supplies and which prevent faults in a power supply from affecting the operation of the other subsystem components.

Figure 1:
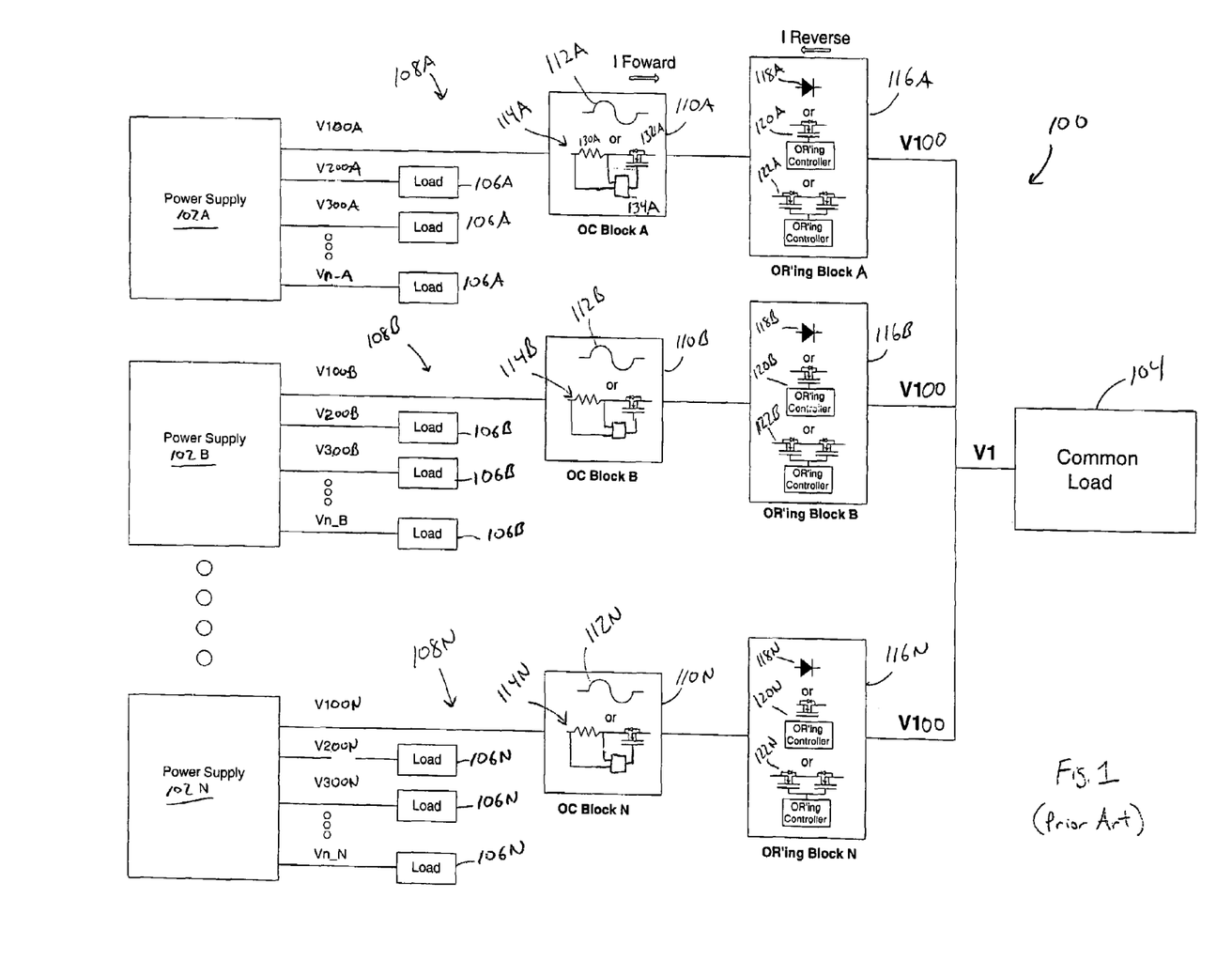
FIG. 1 is a schematic diagram of a Prior Art power supply system having discrete over-current protection and ORing devices.

FIG. 1 is a schematic diagram of a prior art power supply system 100 including a plurality of power supplies 102A, 102B, 102N for supplying redundant power to a common load 104 via common power bus V100. Each of power supplies 102A, 102B, 102N also supply power in a non-redundant manner to loads 106A, 106B and 106N, respectively. Each branch 108A-108N, which delivers power from each power supply 102A-102N to the common power bus V100 includes fault protection devices 110A-110N and 116A-116N, respectively, which are connected to their respective power supplies 102A-102N via power supply lines V100A-V100N.

Fault protection devices 110A-110N provide over-current protection which prevents a fault in the common load from adversely affecting the operation of the associated power supply and the subsystem component loads 106 connected to the associated power supply. For example, a short in the common load would cause an excessive forward current in the power supply lines V100A-V100N. This excessive forward current in supply lines V100A-V100N could cause the associated power lines (V200A-V200N and/or V300A-V300N and/or Vn_A-Vn_N) to either droop or cease to operate altogether if the power supply has internal overcurrent protection. Over-current protection devices 110A-110N may include a passive device, such as a fuse 112A-112N, which trips when the current in power supply line V100A-V100N exceeds a reference value. Alternatively, over-current protection devices 110A-110N may include an active device 114A-114N. Since each active device 114A-114N is identical in configuration and operation, only active device 114A will be described. Active device 114A includes a resistor 130A connected in series with a semiconductor switch 132A, such as a MOSFET. The voltage drop across the resistor 132A, which corresponds to the amount of current flowing in power supply line V100A, is processed in an amplifier/comparator 134A, which has its output connected to the control terminal of the semiconductor switch 132A. When the current in power supply line V100A exceeds a reference value (corresponding to the maximum acceptable current flow), the semiconductor switch 132A is shut off by the output of the amplifier/comparator 134A, thus preventing the excessive forward current from continuing to flow.

Fault protection devices 116A-116N provide an ORing function which prevents a fault, such as a short, in the associated power supply 102A-102N, which would cause a reverse current in the common power bus V100, from affecting the operation of the common load 104, by dragging down the common power bus V100. ORing devices 116A-116N may include a passive device, such as a diode 118A-118N, which would block any reverse current in the common power bus V100. However, such a diode may have a forward voltage drop across it that may be unacceptable for the power supply system.

Alternatively, a single N-channel MOSFET ORing device 120A-120N may be connected in series between the over-current protection device 110A-110N and the common power bus V100 to provide the ORing function. By connecting the source terminal of the MOSFET to the power supply side and the drain terminal to the common power bus V100, current cannot travel in a reverse direction, from the common power bus V100 to the power supply, unless the gate terminal is driven to the ON state by the ORing controller. As is known in the art, the ORing controller monitors the direction of current flow through the MOSFET, creates a sufficient gate voltage via a charge pump circuit to keep the MOSFET in the ON state when current is flowing in the forward direction, from the power supply to the common load and toggles the MOSFET to the OFF state if current begins to flow in the reverse direction. Such an ORing controller can be built using many different discrete components or an "off-the-shelf" controller, such as the MAX8535 controller from Maxim Integrated Products of Sunnyvale, Calif., may be used, with minimal external components, to provide the ORing function to the MOSFET.

Another alternative design of the ORing controller is shown at 122A-122N. This design includes a pair of MOSFETs connected in series, but in opposing directions to each other, between the over-current protection device 110A-110N and the common power bus V100. This design, in addition to providing the ORing function, provides a "soft start" feature, which limits the current demanded from the load at power-up. The soft start feature allows the power-up current to increase gradually by transitioning the MOSFETs at a predetermined rate from the OFF state to the ON state. Since the internal body diode in the MOSFET provides a forward current path through the MOSFET, even when the MOSFET is in the OFF state, the single MOSFET device 120A-120N cannot be used to provide the soft-start feature, which is achieved by connecting the second MOSFET in series with the first MOSFET, but in the opposite direction as the first MOSFET. An ORing controller, such as that described above, can be configured to ramp up the gate voltages for both MOSFETs gradually, thus allowing the pair to operate in the linear region during power-up.

While the above configurations of the over-current protection devices and ORing devices provide the desired protection features, the number of components needed to provide the over-current and ORing functions increases the cost of the system and degrades the electrical and thermal efficiency of the system.

SUMMARY OF THE INVENTION

The present invention is directed to a power supply system which provides fault protection including over-current protection and an ORing function with the soft-start feature. The system operates to prevent excessive forward currents caused by a fault in a load commonly powered by a number of power supplies from affecting the operation of the power supplies.

The system also prevents reverse currents, caused by faults on the power supplies from affecting the commonly-powered load. The system includes a reduced number of components compared to the prior art, resulting in a lower-cost system having improved electrical and thermal efficiency.

According to one aspect, a power supply system includes a power supply; a load coupled to the power supply via a power supply line to receive a voltage therefrom; and a circuit protection device. The circuit protection device includes at least one switch device coupled between the power supply and the load on the power supply line; a first controller coupled to the at least one switch for: A. monitoring current flow through the at least one switch; B. maintaining the at least one switch in an ON state while current flows through the at least one switch in a first direction; and C. causing the at least one switch to toggle to an OFF state if current flowing through the at least one switch flows in a second direction and a second controller coupled to the power supply line between the power supply and the at least one switch and coupled to the at least one switch for sensing an amount of current flowing between the power supply and the at least one switch and causing the at least one switch to toggle to the OFF state when the current sensed by the second controller exceeds a reference value The at least one switch may include a pair of MOSFETs. The first controller may include a first input coupled to the power supply line between the pair of MOSFETs and the power supply, a second input coupled to the power supply line between the pair of MOSFETs and the load, and an output coupled to gate terminals of the pair of MOSFETs, wherein, when the output is in a first state, the pair of MOSFETs is in the ON state and when the output is in a second state, the pair of MOSFETs is in the OFF state. The second controller may include a current sensing device coupled to the power supply line between the power supply and the pair of MOSFETs for sensing the current in the power supply line and outputting a sensed voltage corresponding to the sensed current, a comparing device for comparing the sensed voltage to a reference voltage and outputting a first output when the sensed voltage exceeds the reference voltage and a switch coupled between the comparing device and the gate terminals of the pair of MOSFETs, wherein, the switch, upon receiving the first output of the comparing device, operates to toggle the pair of MOSFETs to the OFF state. The first controller may include a timer device and, upon receiving the first output from the comparing device, the second controller switch operates to disable the timer device, thus driving the output of the first controller from the first state to the second state, causing the pair of MOSFETs to toggle to the OFF state. The first controller may include an undervoltage protection device and, upon receiving the first output from the comparing device, the second controller switch operates to enable the undervoltage protection device, thus driving the output of the first controller from the first state to the second state, causing the pair of MOSFETs to toggle to the OFF state. Upon receiving the first output from the comparing device, the second controller switch may operate to pull the control terminals from the first state to the second state, causing the pair of MOSFETs to toggle to the OFF state.

According to another aspect, a power supply system includes a power supply; a load coupled to the power supply via a power supply line to receive a voltage therefrom; at least one switch device coupled between the power supply and the load on the power supply line; a first controller coupled to the at least one switch for causing the at least one switch to toggle to an OFF state if current flowing through the at least one switch flows in a direction opposite a normal operating current direction; and a second controller coupled to the power supply line between the power supply and the at least one switch and coupled to the at least one switch for sensing an amount of current flowing between the power supply and the at least one switch and causing the at least one switch to toggle to the OFF state when the current sensed by the second controller exceeds a reference value.

According to another aspect, a method of providing fault protection in a power supply system, the method includes:

A. monitoring a current flowing from a power supply to a load via a power supply line;

B. toggling a switch device coupled between the power supply and the load in the power supply line from an ON state to an OFF state when the current begins to flow from the load to the power supply;

C. monitoring the amplitude of the current flowing in the power supply line; and D. toggling the switch device from the ON state to the OFF state when the amplitude of the current in the power supply line exceeds a reference value.

According to yet another aspect, a fault protection system, includes means for monitoring a current flowing from a power supply to a load via a power supply line; means for toggling a switch device coupled between the power supply and the load in the power supply line from an ON state to an OFF state when the current begins to flow from the load to the power supply; means for monitoring the amplitude of the current flowing in the power supply line; and means for toggling the switch device from the ON state to the OFF state when the amplitude of the current in the power supply line exceeds a reference value.

BRIEF DESCRIPTION OF THE DRAWINGS

These and other features of the invention will become more readily apparent from the following detailed description when read together with the accompanying drawings, in which.

DETAILED DESCRIPTION

Figure 2:
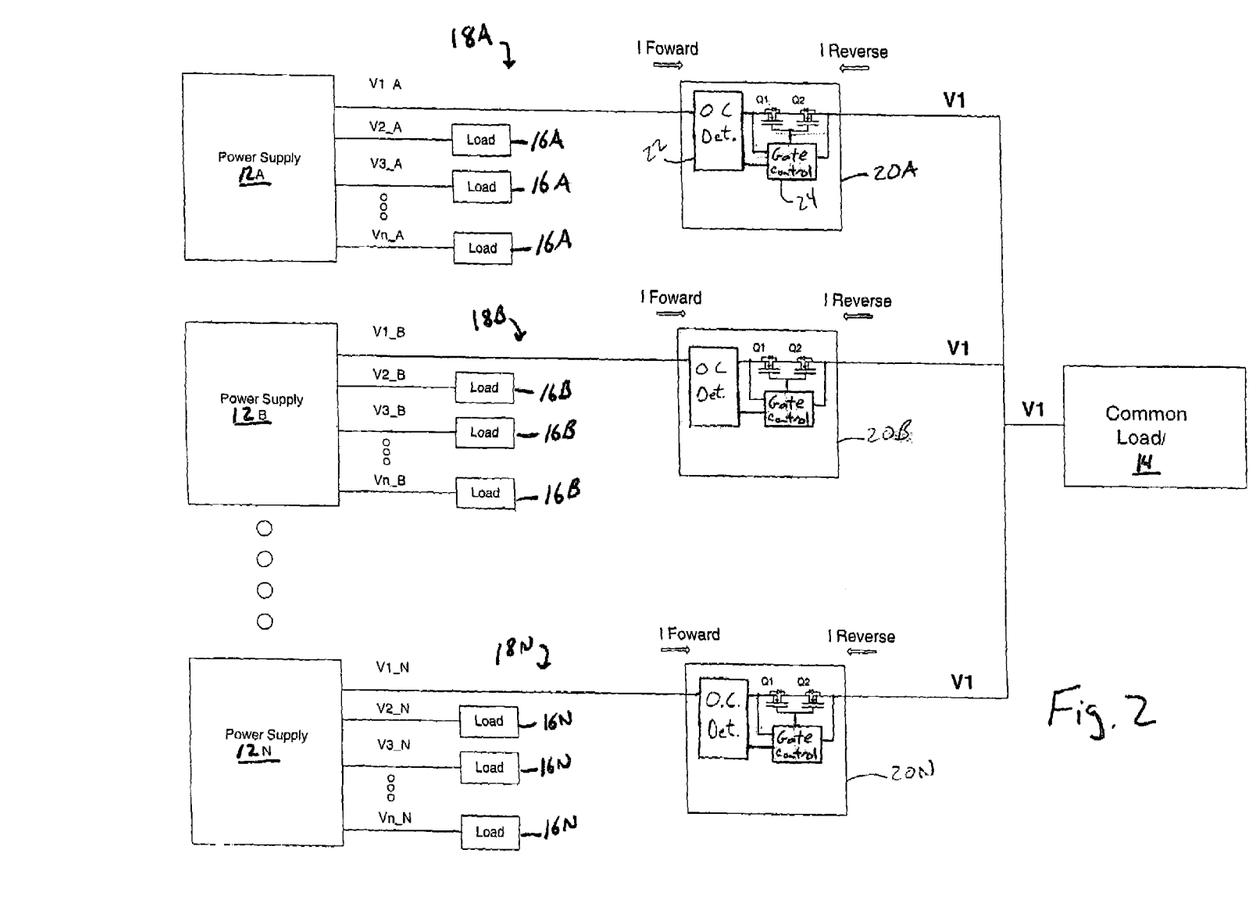
FIG. 2 is a schematic diagram of the power supply system according to the present invention having integrated over-current protection and ORing devices.

FIG. 2 is a schematic diagram of a power supply system 10 including a plurality of power supplies 12A, 12B, 12N for supplying redundant power to a common load 14 via common power bus V1. Each of power supplies 12A, 12B, 12N also supply power in a non-redundant manner to loads 16A, 16B and 16N, respectively. Each branch 18A-18N, which delivers power from each power supply 12A-12N to the common power bus V1, includes fault protection devices 20A-20N, respectively, which are connected to their respective power supplies 12A-12N via power supply lines V1A-V1N.

Since fault protection devices 20A-20N are identical in configuration and operation, only fault protection device 20A will be specifically described. Fault protection device 20A includes an over-current detection device 22 coupled in series with switches Q1 and Q2, which are preferably MOSFETs, between the power supply 12A and the common power bus V1. MOSFETs Q1 and Q2 are connected in opposing directions to each other and have their gate terminals commonly connected. As shown in FIG. 2, MOSFET Q1 has its source terminal coupled to the over-current detection device 22 and its drain terminal coupled to the drain terminal of MOSFET Q2. The source terminal of MOSFET Q2 is coupled to the common power bus V1. It will be understood that the direction in which each of the MOSFETs Q1 and Q2 are connected does not matter, as long as they are connected in opposite directions with respect to each other. A gate control device 24 is coupled to the gate terminals of MOSFETs Q1 and Q2, the upstream side (supply side) of MOSFETs Q1 and Q2, the downstream side (V1 side) of MOSFETs Q1 and Q2, and to an output of the over-current detection device 22.

FIGS. 3-6 are schematic diagrams showing different embodiments of the fault protection device 20A. In each of the embodiments, the configuration and operation of the gate control device 24, absent the influence of the output of the over-current detection device 22, is identical. The gate control device 24 includes an ORing controller 26, such as the MAX8535 controller from Maxim Integrated Products of Sunnyvale, Calif. The Gate output of the controller 26 is coupled to the gate terminals of the MOSFETs Q1 and Q2 through gate resistor Rg, for providing a gate voltage $V_G$ thereto. The Gate output is also coupled to ground through capacitor Cg. The input current pin CS of the controller 26 is connected to the common power bus V1 and the Vcc input is connected to the V1A power supply line. Under voltage protection pin UVP is coupled to the V1A power supply line through a voltage divider including resistors Rx and Ry and the Timer pin is coupled to ground through resistor Rt.

In operation, the gate control device 24 determines when MOSFETs Q1 and Q2 should be toggled to the ON state and the OFF state, based on current conditions present in the common power bus V1 and the power supply line V1A. The voltage on power supply line V1A is divided down by resistors Rx and Ry. This voltage is then input to the UVP pin of the controller 26 and compared to a UVP reference voltage level. If the divided voltage input to the UVP pin of the controller 26 drops below the UVP reference voltage level, indicating that no or low voltage is present on the power supply line V1A, the controller 26 switches the MOSFETs Q1 and Q2 to the OFF state by disabling the Gate output. When the divided voltage input to the UVP pin of the controller 26 is above the reference voltage level, the Gate output is enabled to provide the gate voltage $V_G$ to the gate terminals of MOSFETs Q1 and Q2 to toggle the MOSFETs Q1 and Q2 to the ON state.

The rate at which the MOSFETs Q1 and Q2 are turned on is a function of the rate at which the gate voltage $V_G$ is ramped up. The values of resistor Rg and capacitor Cg, as well as resistor Rt, which controls the internal charge pump frequency of the controller 26, are manipulated to determine how quickly the gate voltage $V_G$ is ramped up. As described above, controlling the rate at which the gate voltage $V_G$ increases allows the power-up current to increase gradually by transitioning the MOSFETs at a predetermined rate from the OFF state to the ON state. This is the "soft-start" feature which limits the current demanded from the load at power-up. This "soft-start" feature is particularly useful when there is system capacitance on the Common Load Bus (V1) that would demand a surge current at power-up if it were not limited by the "soft-start" feature.

The controller 26 also measures the voltage drop across the MOSFETs Q1 and Q2 by comparing the voltages received at its CS and VCC pins. Through the measurement of the voltage drop, the controller 26 determines the direction of current flow through the MOSFETs Q1 and Q2. When the controller 26 determines that current is flowing through the MOSFETs Q1 and Q2 in the direction indicated by arrow 30, the MOSFETs Q1 and Q2 are maintained in the ON state. However, if the controller 26 determines that current is flowing through the MOSFETs Q1 and Q2 in the direction opposite that indicated by arrow 30, the Gate output goes low and the MOSFETs Q1 and Q2 are toggled to the OFF state, thus preventing the reverse current flow from dragging down the Load Bus (V1).

Figure 3:
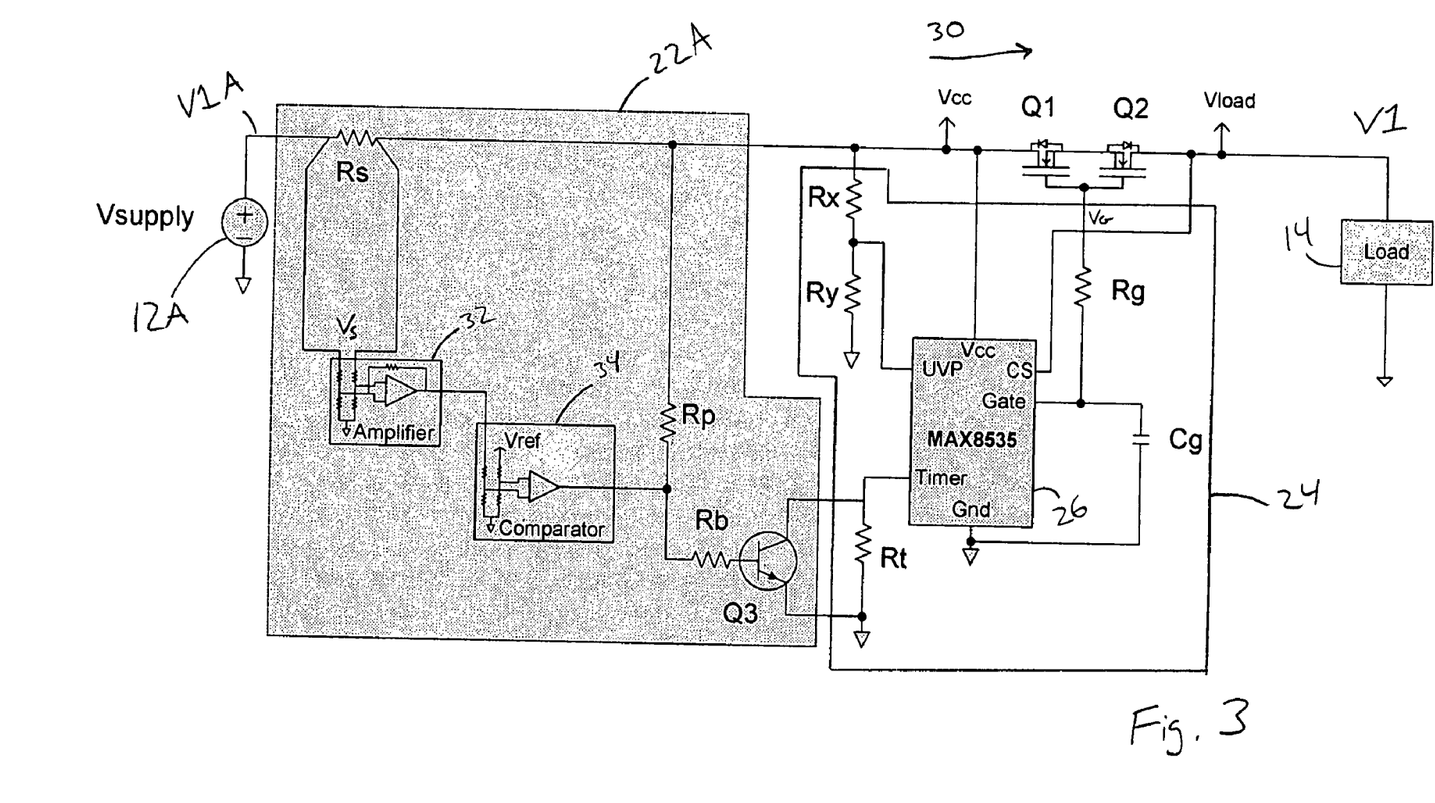
FIG. 3 is a schematic circuit diagram of one embodiment of the fault protection device of the present invention.

Shown in FIG. 3 is one embodiment of the over-current detection device 22A. Over-current detection device 22A includes a sense resistor Rs connected in series with the MOSFETs Q1 and Q2 between the power supply 12A and the MOSFETs Q1 and Q2. Resistor Rs senses the current flowing in power supply line V1A and the resulting voltage drop Vs across resistor Rs is input to an amplifier 32. The amplified voltage is then input to a comparator 34 where it is compared to an over-current detection threshold voltage, Vref. Preferably, the comparator 34 operates in a latch-and-compare manner. As long as the voltage input to the comparator 34 is less than the over-current detection threshold voltage Vref, meaning that the current flowing through resistor Rs is below a threshold value, the output of the comparator 34 remains low and the gate control device 24 operates as described above.

If the voltage input to the comparator 34 is greater than the over-current detection threshold voltage Vref, meaning that the current flowing through resistor Rs has exceeded the threshold value, the output of the comparator 34 goes open-collector, causing transistor Q3 to be turned on by the voltage supplied to transistor Q3 through pull-up resistor Rp. In the configuration of over-current detection device 22A of FIG. 3, transistor Q3 has its collector terminal coupled to the Timer pin of controller 26 and its emitter coupled to ground. Therefore, when transistor Q3 is turned on, the Timer pin is shorted to ground, causing the charge pump (not shown) internal to the controller 26 to shut down, which causes the Gate output of the controller to go low. This causes the gate voltage $V_G$ to also go low, which toggles the MOSFETs Q1 and Q2 to the OFF state, which blocks the excessive current detected in the resistor Rs from continuing to flow.

Figure 4:
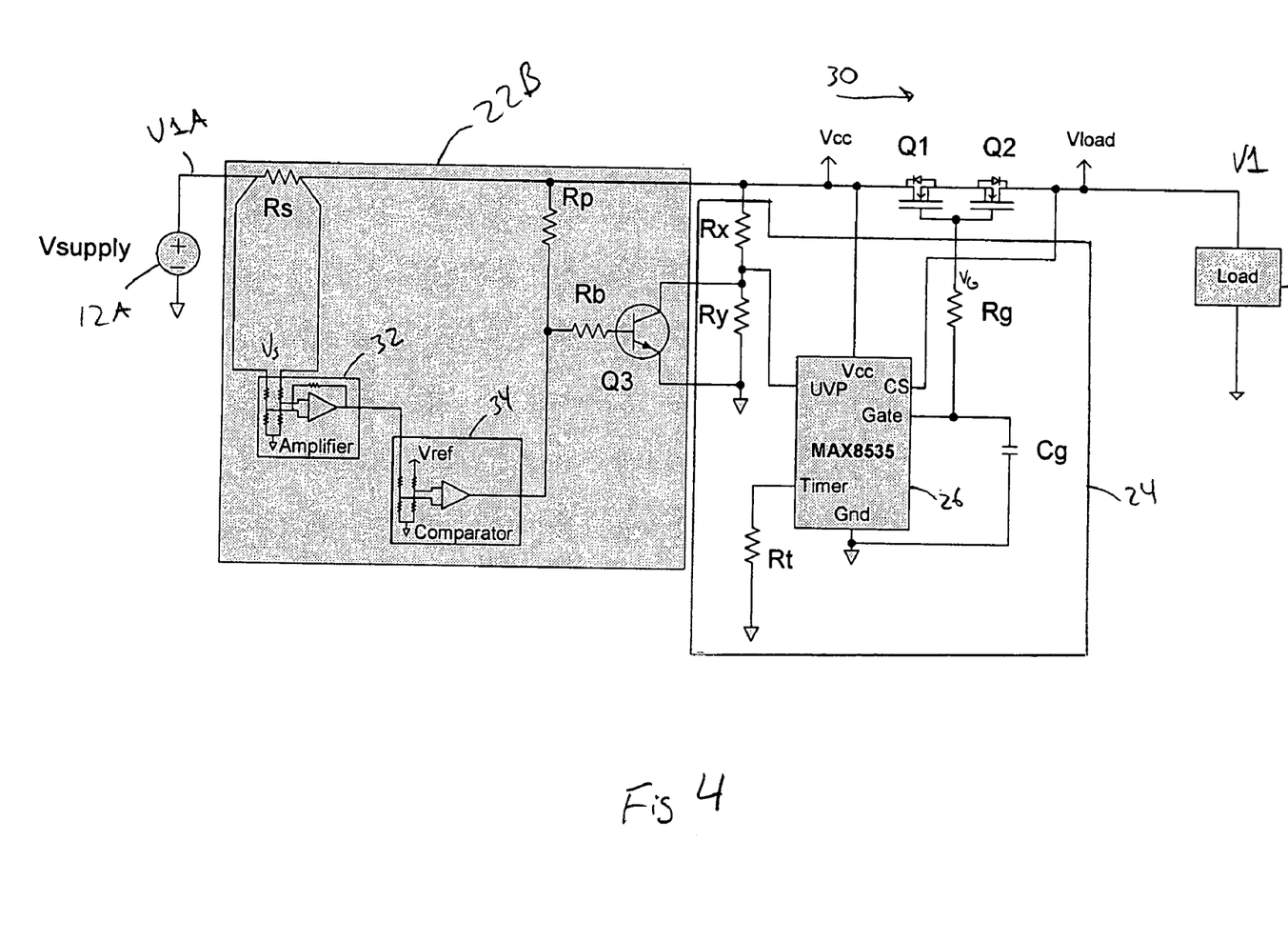
FIG. 4 is a schematic circuit diagram of a second embodiment of the fault protection device of the present invention.

In the configuration of over-current detection device 22B shown in FIG. 4, the operation of the resistor Rs, amplifier 32 and comparator 34 is the same as in over-current detection device 22A, described above. However, in over-current detection device 22B, transistor Q3 has its collector terminal coupled to the UVP pin of controller 26 and its emitter coupled to ground. Therefore, when the output of comparator 34 goes high, based on the detection of a current that exceeds the over-current detection threshold Vref, transistor Q3 is turned on through resistor Rp, causing the UVP pin to be shorted to ground. This causes the UVP reference voltage level to be compared to the ground voltage. Since the ground voltage input to the UVP pin of the controller 26 is below the UVP reference voltage level, the controller 26 determines that no or low voltage is present on the power supply line V1A, and the controller 26 drives the Gate output low. This causes the gate voltage $V_G$ to also go low, which toggles the MOSFETs Q1 and Q2 to the OFF state, which blocks the excessive current detected in the resistor Rs from continuing to flow.

Figure 5:
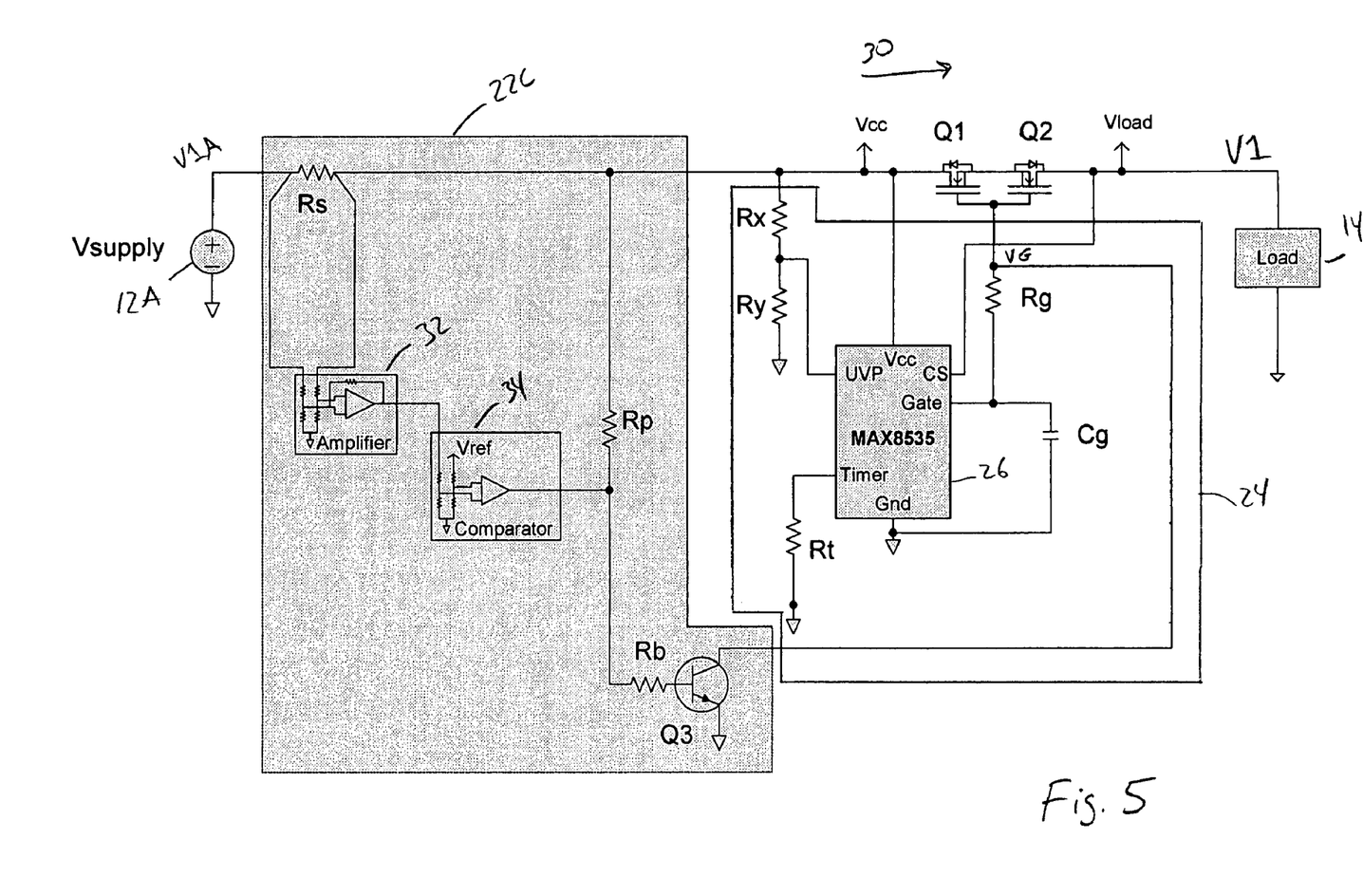
FIG. 5 is a schematic circuit diagram of a third embodiment of the fault protection device of the present invention.

In the configuration of over-current detection device 22C shown in FIG. 5, the operation of the resistor Rs, amplifier 32 and comparator 34 is the same as in over-current detection device 22A, described above. However, in over-current detection device 22C, transistor Q3 has its collector terminal coupled to the common gate terminals of MOSFETs Q1 and Q2 and its emitter coupled to ground. Therefore, when the output of comparator 34 goes high, based on the detection of a current that exceeds the over-current detection threshold Vref, transistor Q3 is turned on through resistor Rp. This causes the common gate terminals of MOSFETs Q1 and Q2 to be shorted to ground, which causes the MOSFETs Q1 and Q2 to be toggled to the OFF state, which blocks the excessive current detected in the resistor Rs from continuing to flow. Since the Gate output of the controller 26 remains high, the difference in voltage between the Gate output and the common gate terminals of the MOSFETs is dropped across resistor Rg.

Figure 6:
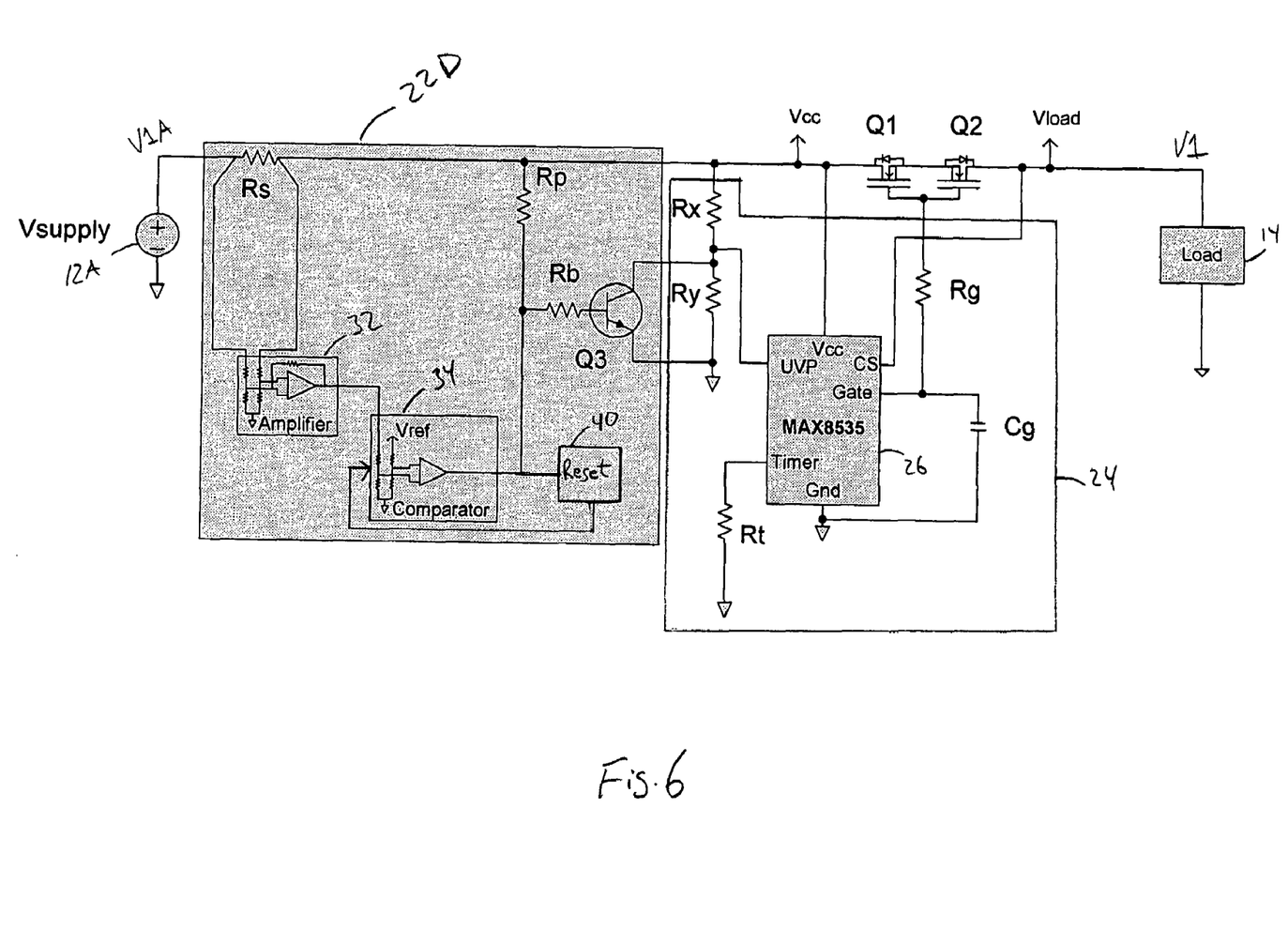
FIG. 6 is a schematic circuit diagram of a fourth embodiment of the fault protection device of the present invention.

In the configuration of over-current detection device 22D shown in FIG. 6, the operation of the resistor Rs, amplifier 32, comparator 34 and transistor Q3 is the same as in over-current detection device 22B, described above with reference to FIG. 4. However, over-current detection device 22D further includes a reset device 40 coupled between the output of the comparator 34 and a reset input of the comparator 34. Reset device 40 may include any type of timing circuitry, which outputs a reset signal to the comparator a predetermined period of time after the output of the comparator goes high. The reset signal causes the comparator to unlatch the currently latched voltage and to latch on the next available voltage. While the comparator is unlatched, its output is low and the controller 26 is enabled to drive its Gate output high, resulting in MOSFETs Q1 and Q2 being toggled to the ON state. If the next voltage latched by the comparator is below the over-current detection threshold Vref, the controller 26 maintains this mode of operation. However, if the next voltage latched by the comparator exceeds the over-current detection threshold Vref, the output of the comparator goes high, causing the controller 26 to drive its Gate output low, causing the MOSFETs Q1 and Q2 to be toggled to the OFF state. After the predetermined period of time dictated by the reset device 40, the comparator will be reset by the reset device 40 and the process will repeat. In the event of a continued over-current condition, the MOSFETs Q1 and Q2 will be toggled between the ON and OFF states at a rate determined by the duty cycle of the reset device 40. This configuration enables the system to be reset after the MOSFETs are shut down without requiring external intervention should the fault be caused by a temporary situation in the system.

It will be understood that the reset device 40 may also be used in conjunction with the over-current detection devices 22A and 22C shown in FIGS. 3 and 5, to provide a reset signal to the comparator 34. This would require that the reset device 40 have an input coupled to the output of the comparator 34 and an output coupled to the reset input of comparator 34. The operation of such configurations is identical to that described above.

Accordingly, the present invention provides a fault protection for a power supply system which minimizes the number of components used to carry out the over-current detection, ORing and soft start functions. All of these functions are able to be carried out using a pair of MOSFETs connected in series between the common load and the power supply. In an alternative embodiment, the over-current detection and soft-start functions may be carried out using a single MOSFET connected in series between the common load and the power supply, having its gate coupled to the Gate output of the controller. The minimal number of components connected in series between the common power bus and the power supplies increases the electrical and thermal efficiency of the power supply system. The invention may be utilized to supply fault protection in any type of redundant power supply system, in which a number of power supplies provide power to a commonly connected load.

The invention may be embodied in other specific forms without departing from the spirit or essential characteristics thereof. For example, the MOSFETs Q1 and Q2 and the transistor Q3 may be any type of switches that are capable of carrying out the functions described herein. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

The invention claimed is:
1. A power supply system comprising:
  a power supply;
  a load coupled to the power supply via a power supply line to receive a voltage therefrom;
  a circuit protection device comprising:
  at least one switch device coupled between the power supply and the load on the power supply line;
  a first controller coupled to the at least one switch for:
    A. monitoring current flow through the at least one switch;
    B. maintaining the at least one switch in an ON state while current flows through the at least one switch in a first direction; and
    C. causing the at least one switch toggle to an OFF state if current flowing through the at least one switch flows in a second direction; and
  a second controller coupled to the power supply line between the power supply and the at least one switch and coupled to the first controller for sensing an amount of current flowing between the power supply and the at least one switch and causing the first controller toggle the at least one switch to the OFF state when the current sensed by the second controller exceeds a reference value;
  wherein the first controller comprises a first input coupled to the power supply line between the at least one switch and the power supply, a second input coupled to the power supply line between the at least one switch and the load, and an output coupled to gate terminals of the at least one switch, wherein, when the output is in a first state, the at least one switch is in the ON state and when the output is in a second state, the at least one switch is in the OFF state;
  wherein the second controller comprises a current sensing device coupled to the power supply line between the power supply and the at least one switch for sensing the current in the power supply line and outputting a sensed voltage corresponding to the sensed current, a comparing device for comparing the sensed voltage to a reference voltage and outputting a first output when the sensed voltage exceeds the reference voltage and a switch coupled between the comparing device and the gate terminals of the at least one switch, wherein the switch, upon receiving the first output of the comparing device, operates toggle the at least one switch to the OFF state; and
  wherein the first controller comprises an undervoltage protection device and, upon receiving the first output from the comparing device, the second controller switch operates to enable the undervoltage protection device, thus driving the output of the first controller from the first state to the second state, causing the at least one switch to toggle to the OFF state.

2. The power supply system of claim 1 wherein the at least one switch comprises a pair of MOSFETs.

3. A power supply system comprising:
a power supply;
a load coupled to the power supply via a power supply line to receive a voltage therefrom;
a circuit protection device comprising:
at least one switch device coupled between the power supply and the load on the power supply line;
a first controller coupled to the at least one switch for:
  A. monitoring current flow through the at least one switch;
  B. maintaining the at least one switch in an ON state while current flows through the at least one switch in a first direction; and
  C. causing the at least one switch to toggle to an OFF state if current flowing through the at least one switch flows in a second direction; and
a second controller coupled to the power supply line between the power supply and the at least one switch and coupled to the first controller for sensing an amount of current flowing between the power supply and the at least one switch and causing the first controller to toggle the at least one switch to the OFF state when the current sensed by the second controller exceeds a reference value;
wherein the first controller comprises a first input coupled to the power supply line between the at least one switch and the power supply, a second input coupled to the power supply line between the at least one switch and the load, and an output coupled to a control terminal of the at least one switch, wherein, when the output is in a first state, the at least one switch is in the ON state and when the output is in a second state, the at least one switch is in the OFF state;
wherein the second controller comprises a current sensing device coupled to the power supply line between the power supply and the at least one switch for sensing the current in the power supply line and outputting a sensed voltage corresponding to the sensed current, a comparing device for comparing the sensed voltage to a reference voltage and outputting a first output when the sensed voltage exceeds the reference voltage and a switch coupled between the comparing device and the gate terminals of the at least one switch wherein the switch, upon receiving the first output of the comparing device, operates to toggle the at least one switch to the OFF state; and
wherein the first controller comprises an undervoltage protection device and, upon receiving the first output from the comparing device, the second controller switch operates to enable the undervoltage protection device, thus driving the output of the first controller from the first state to the second state, causing the at least one switch to toggle to the OFF state.

4. A power supply system comprising:
a power supply;
a load coupled to the power supply via a power supply line to receive a voltage therefrom;
at least one switch coupled between the power supply and the load on the power supply line;
a first controller coupled to the at least one switch for causing the at least one switch toggle to an OFF state if current flowing through the at least one switch flows in a direction opposite a normal operating current direction; and
a second controller coupled to the power supply line between the power supply and the at least one switch and coupled to the first controller for sensing an amount of current flowing between the power supply and the at least one switch and causing the first controller to toggle the at least one switch to the OFF state when the current sensed by the second controller exceeds a reference value;
wherein the first controller comprises a first input coupled to the power supply line between the at least one switch and the power supply, a second input coupled to the power supply line between the at least one switch and the load, and an output coupled to gate terminals of the at least one switch, wherein, when the output is in a first state, the at least one switch is in the ON state and when the output is in a second state, the at least one switch is in the OFF state;
wherein the second controller comprises a current sensing device coupled to the power supply line between the power supply and the at least one switch for sensing the current in the power supply line and outputting a sensed voltage corresponding to the sensed current, a comparing device for comparing the sensed voltage to a reference voltage and outputting a first output when the sensed voltage exceeds the reference voltage and a switch coupled between the comparing device and the gate terminals of the at least one switch, wherein the switch, upon receiving the first output of the comparing device, operates to toggle the at least one switch to the OFF state; and
wherein the first controller comprises an undervoltage protection device and, upon receiving the first output from the comparing device, the second controller switch operates to enable the undervoltage protection device, thus driving the output of the first controller from the first state to the second state, causing the at least one switch to toggle to the OFF state.

5. The power supply system of claim 4 wherein the at least one switch comprises a pair of MOSFETs.

* * * * *